United States Patent
Brüggemann et al.

[11] Patent Number: 6,076,564
[45] Date of Patent: Jun. 20, 2000

[54] FLAT TEXTILE STRUCTURE WITH PREDETERMINED SEPARATION LINE

[75] Inventors: Werner Brüggemann, Krefeld; Uwe Kloeckes, Viersen, both of Germany

[73] Assignee: Viktor Achter GmbH & Co. KG, Viersen, Germany

[21] Appl. No.: 09/271,535

[22] Filed: Mar. 18, 1999

[30] Foreign Application Priority Data

Mar. 18, 1998 [DE] Germany .................. 198 11 685

[51] Int. Cl.$^7$ .................................. D03D 25/00
[52] U.S. Cl. .................................. 139/413; 139/383 R
[58] Field of Search ................... 139/407, 408, 139/413, 414, 415

[56] References Cited

U.S. PATENT DOCUMENTS

| | | | |
|---|---|---|---|
| 3,978,894 | 9/1976 | Boone | 139/383 R |
| 4,729,412 | 3/1988 | Bugge | 139/383 R |
| 5,219,004 | 6/1993 | Chiu | 139/383 A |
| 5,564,476 | 10/1996 | Golz | 139/388 |

FOREIGN PATENT DOCUMENTS

| | | |
|---|---|---|
| 0033934 | 2/1981 | European Pat. Off. . |
| 101 559 A 1 | 7/1992 | Germany . |
| 1 26 527 A 1 | 2/1993 | Germany . |
| 121928 | 10/1966 | Netherlands . |
| 1 507 152 | 4/1978 | United Kingdom . |

*Primary Examiner*—John J. Calvert
*Assistant Examiner*—Robert H. Muromoto, Jr.
*Attorney, Agent, or Firm*—Terry T. Moyer; William S. Parks

[57] ABSTRACT

In a double woven fabric with an upper layer and a lower layer, provision is made that, in the area of a desired predetermined separation line, a thread system with warp threads and weft threads alternates out of the upper layer into the lower layer and a thread system alternates out of the lower into the upper layer. At both sides of the desired predetermined separation line, the threads alternating between the upper layer and the lower layer and vice versa are separated in the lower layer. Created thereby is a flat textile structure with a predetermined separation line invisible from the viewing side of the surface of the double woven fabric.

15 Claims, 2 Drawing Sheets

FLAT TEXTILE STRUCTURE WITH PREDETERMINED SEPARATION LINE

BACKGROUND ART

Flat textile structures are known, which, when necessary, open or divide in a defined area when a predetermined minimal force is applied transversely to the woven plane. Such flat textile structures with a predetermined separation line are used, e.g., in motor vehicles as the covering of the inside of doors over airbags mounted in the doors. The known flat textile structures have, in the area of the predetermined separation line, abutting fringed edges, which are joined together on the opposing sides by the seams. The number and strength of the seams are so designed that the flat textile structures is held together in the normal state and, when the airbag is released, is opened by the force exerted by the airbag in the area of the predetermined separation line.

A disadvantage of the known fabrics of this type is the fact that the predetermined separation line is always visible as a seam and visually unattractive.

DESCRIPTION OF THE INVENTION

The fundamental objective of the invention is to create a flat textile structure, which has a predetermined separation line that is invisible from the viewing side.

In realization of this objective, a flat textile structure is provided which has a double weave with an upper layer and a lower layer with thread systems each with warp and weft threads, in which, in the area of the desired predetermined separation line, a thread system alternating from the upper into the lower layer and a thread system alternating from the lower into the upper layer is provided, and at both sides of the desired predetermined separation line the threads of the thread systems alternating in the area of the predetermined separation line between the upper and the lower layer and the upper and the lower layer [sic] are separated. Since the threads of each thread system alternating from the upper into the lower layer and vice versa are cut in each case in front of and behind this alternation point in the area of the lower layer, the separated threads slip by one another transversely to the predetermined separation line when a force is applied, and continue to do so until the flat textile structure is separated into two parts in the area of the predetermined separation line. The presence of the predetermined separation line in the normal state is, however, not visible from the upper or visible side of the flat textile structure. The thread systems alternating from the upper to the lower layer and vice versa can be either warp or weft threads.

The flat textile structure can be produced as a dobby weave fabric or also as a jacquard fabric, a uniformly colored or patterned fabric and as fabric with variable textures. After the weaving operation, except for the cutting or separation operation, no further work processes, such as gluing and/or sewing of fabric parts, e.g., are necessary.

The flat textile structure of the invention with predetermined separation line can be utilized in many ways, for example, as geotextiles in landscape architecture, as coverings for containers, as carrier materials or also as coverings for technical components.

DESCRIPTION OF THE DRAWINGS

The invention is explained in greater detail below with references to examples illustrated in the appended drawings These show.

Figure 1:
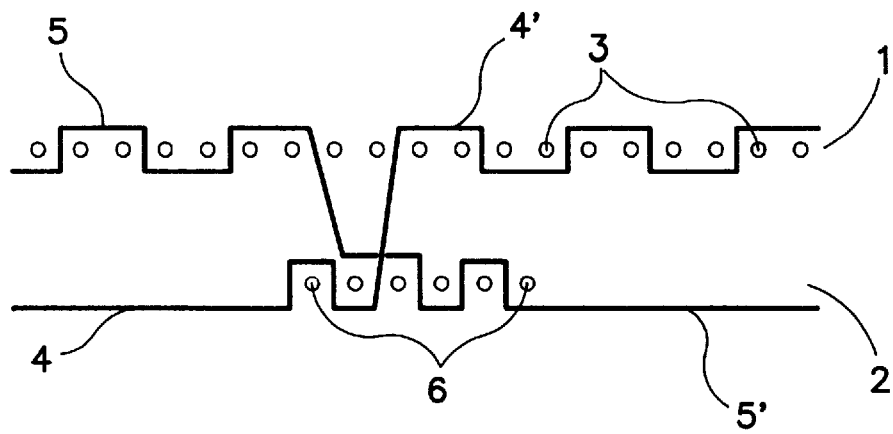
FIG. 1, a schematic section through a double woven fabric, with thread systems alternating between the upper and the lower layer.

A flat textile structure has a schematically depicted upper layer (1) and lower layer (2), also schematically depicted. The upper layer (1) has warp threads (3) as well as weft threads (4) and (5). The lower layer (2) has warp threads (6) as well as weft threads (4') and (5'). In a comparable manner, the weft threads (4') alternate out of the lower layer (2) into the upper layer (1) and are there continued as weft threads (4).

Figure 2:
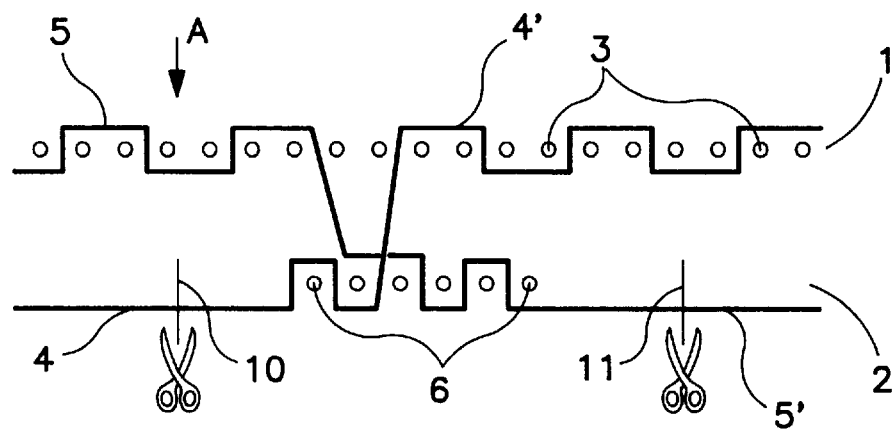
FIG. 2, a depiction comparable to FIG. 1 with a schematic indication of the seperation of the thread systems, alternating between the upper and the lower layer and vice versa, in the lower layer.
Figure 3:
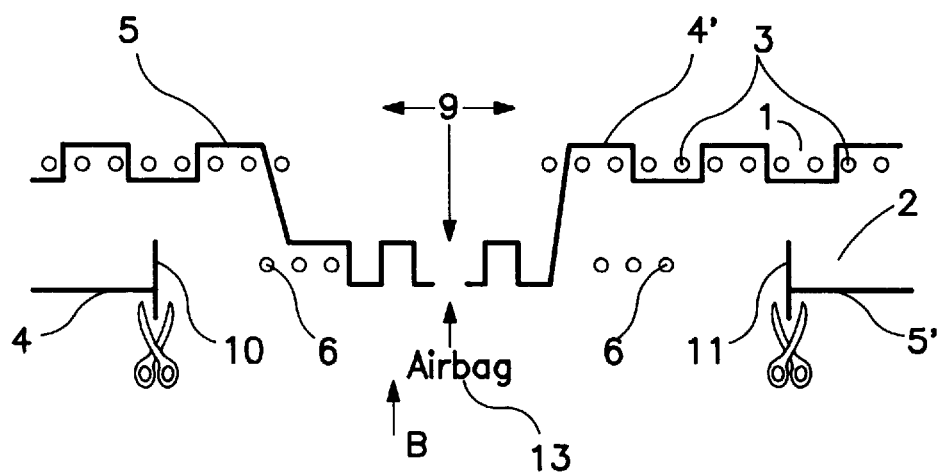
FIG. 3, a depiction comparable to FIG. 2 with the schematic illustration of a airbag acting upon the flat textile structure from the lower layer side in the area of the predetermined separation line.
Figure 4:
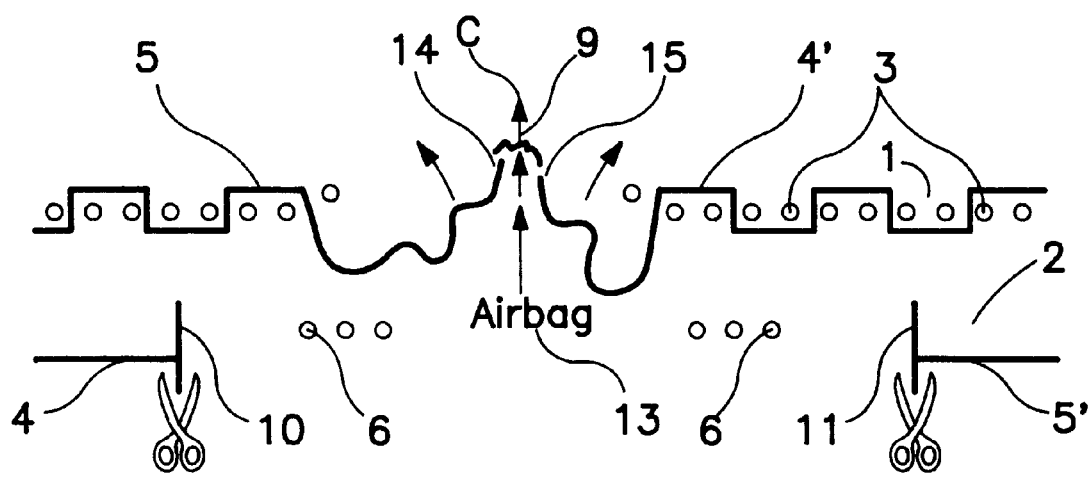
FIG. 4, a depiction comparable to FIG. 3 with the predetermined separation line opened by the action of the force exerted by the airbag.

To achieve the desired predetermined separation line, the warp threads (4') and (5') in the lower layer (2) are separated at both sides of the area of the predetermined separation line (9) as indicated within FIGS. 3 and 4, as indicated by the schematic separation points (10) and (11) and illustrated in FIG. 2. The separation points (10) and (11) are not visible when the upper side of the upper layer (1) is viewed in the direction of the arrow (A).

When—for instance by the airbag (13) shown schematically in FIG. 3—a force transverse to the plane of the flat textile structure consisting of the lower and upper layer is applied in the direction of the arrow (B) to the underside of the lower layer (2), the separated weft threads (4) and (5) are pulled out of the lower layer (2) so far that the ends (14) and (15) are fully released from the lower layer, so that an opening action ensues in the direction of the arrow (C) along the predetermined separation line (9) as indicated within FIG. 4.

The opening force is dependent upon the woven density, the type of binding, the characteristics of the threads and the construction of the weave.

What we claim is:

1. A flat textile structure having both an upper layer and a lower layer; wherein each of said upper layer and said lower layer comprise warp threads and weft threads which form a double weave within said flat textile structure; wherein either of said warp threads or said weft threads is configured into a first thread system and a second thread system; wherein said first thread system alternates out of said upper layer into said lower layer and said second thread system alternates out of said lower layer into said upper layer; wherein said flat textile structure comprises a predetermined separation line such that said flat textile structure has a first side and a second side in relation to said separation line; and, wherein the threads of said first thread system and said second thread system possess separation points within said lower layer in both the first and second sides of said flat textile structure.

2. The flat textile structure of claim 1 wherein said first thread system and said second thread system are weft threads.

3. The flat textile structure of claim 1 wherein said first thread system and said second thread system are warp threads.

4. A covering for technical components comprising the flat textile structure of claim 1.

5. A covering for technical components comprising the flat textile structure of claim 2.

6. A covering for technical components comprising the flat textile structure of claim 3.

7. A geotextile in landscape architecture comprising the flat textile structure of claim 1.

8. A geotextile in landscape architecture comprising the flat textile structure of claim 2.

9. A geotextile in landscape architecture comprising the flat textile structure of claim 3.

10. A container covering comprising the flat textile structure of claim 1.

11. A container covering comprising the flat textile structure of claim 2.

12. A container covering comprising the flat textile structure of claim 3.

13. A carrier of material comprising of the flat textile structure of claim 1.

14. A carrier of material comprising of the flat textile structure of claim 2.

15. A carrier of material comprising of the flat textile structure of claim 3.

* * * * *